US011636477B2

(12) United States Patent
Nakamura

(10) Patent No.: US 11,636,477 B2
(45) Date of Patent: Apr. 25, 2023

(54) DATA USAGE METHOD, SYSTEM, AND PROGRAM THEREOF EMPLOYING BLOCKCHAIN NETWORK (BCN)

(71) Applicant: Takayuki Nakamura, Fukuoka (JP)

(72) Inventor: Takayuki Nakamura, Fukuoka (JP)

(73) Assignee: Takayuki Nakamura, Fukuoka (JP)

( * ) Notice: Subject to any disclaimer, the term of this patent is extended or adjusted under 35 U.S.C. 154(b) by 509 days.

(21) Appl. No.: 16/473,671

(22) PCT Filed: Dec. 28, 2017

(86) PCT No.: PCT/JP2017/047345
§ 371 (c)(1),
(2) Date: Sep. 16, 2019

(87) PCT Pub. No.: WO2018/124297
PCT Pub. Date: Jul. 5, 2018

(65) Prior Publication Data
US 2020/0019963 A1   Jan. 16, 2020

(30) Foreign Application Priority Data

Dec. 28, 2016 (JP) .............................. JP2016-256339

(51) Int. Cl.
*G06Q 20/40* (2012.01)
*G06Q 20/38* (2012.01)
(Continued)

(52) U.S. Cl.
CPC ......... *G06Q 20/401* (2013.01); *G06Q 20/389* (2013.01); *G06Q 20/3823* (2013.01);
(Continued)

(58) Field of Classification Search
CPC ............. G06Q 20/401; G06Q 20/3823; G06Q 20/389; H04L 9/0643; H04L 9/3242;
(Continued)

(56) References Cited

U.S. PATENT DOCUMENTS 8,793,509 B1 * 7/2014 Nelson .................. G06F 21/335
                                                         713/193
9,935,934 B1 * 4/2018 Orozco ................. H04L 9/3213
(Continued)

FOREIGN PATENT DOCUMENTS

EP     2120158 A1    11/2009
JP   2012181728 A     9/2012
(Continued)

OTHER PUBLICATIONS

International Search Report (in Japanese with English Translation) for PCT/JP2017/047345, dated Mar. 6, 2018; ISA/JP.
(Continued)

*Primary Examiner* — John W Hayes
*Assistant Examiner* — Yingying Zhou
(74) *Attorney, Agent, or Firm* — Harness, Dickey & Pierce, P.L.C.

(57) ABSTRACT

The purpose of the present invention is to provide a new data utilization system in which, while an individual independently uses and utilizes one's own personal data, security and anonymity of the data can be effected. An information processing device used by an individual comprises: a function of transmitting, over a network, data relating to an address on a blockchain network used by the individual to a provider-side information processing device comprising a storage device that is a provision source of data associated with information about the individual; a function of referring to access data (ACT) that includes the data relating to the blockchain network address and data for identifying the provision source of the data and that is issued by the provision-side information processing device for the blockchain network address; and a function of, on the basis of the access data (ACT), acquiring the data associated with the information about the individual from the provider-side storage device and storing said data at least in a storage device or a memory of said individual.

16 Claims, 12 Drawing Sheets

(51) Int. Cl.
    *H04L 9/06*           (2006.01)
    *H04L 9/32*           (2006.01)
    *H04L 9/00*           (2022.01)

(52) U.S. Cl.
    CPC .......... *H04L 9/0643* (2013.01); *H04L 9/3242* (2013.01); *H04L 9/50* (2022.05); *H04L 2209/56* (2013.01)

(58) Field of Classification Search
    CPC ............. H04L 2209/38; H04L 2209/56; H04L 63/0421; H04L 63/0807; H04L 2209/88; H04L 63/123; H04L 9/3239; H04L 63/10; G06F 12/00; G06F 21/62
    See application file for complete search history.

(56) References Cited

U.S. PATENT DOCUMENTS

| | | | |
|---|---|---|---|
| 2013/0054803 A1* | 2/2013 | Shepard | G06F 21/6281 709/225 |
| 2014/0368601 A1 | 12/2014 | deCharms | |
| 2015/0205929 A1 | 7/2015 | Brama | |
| 2016/0125170 A1* | 5/2016 | Abramowitz | H04L 63/08 705/2 |
| 2016/0260095 A1* | 9/2016 | Ford | H04L 9/3242 |
| 2016/0308855 A1* | 10/2016 | Lacey | H04L 63/061 |

FOREIGN PATENT DOCUMENTS

| | | |
|---|---|---|
| JP | 2016218633 A | 12/2016 |
| JP | 2018109994 A | 7/2018 |
| WO | WO-2008108158 A1 | 9/2008 |
| WO | WO-2014182638 A2 | 11/2014 |

OTHER PUBLICATIONS

Extended European Search Report dated Jul. 8, 2020 in corresponding EP Application No. 17887374.1.
Office Action dated Feb. 4, 2021 in corresponding Japanese patent application No. 2018-559646 with partial English translation.
EPO Communication dated Jan. 4, 2022 in corresponding EP Application No. 17887374.1.
Office Action dated Feb. 24, 2023 in corresponding Japanese patent application No. 2021-214819.

* cited by examiner (DATA CONFIGURATION OF ACCESS TICKET (Access ticket (ACT))

(DATA CONFIGURATION OF MASTER DATA (MA) AND TRANSACTION DATA (TR))

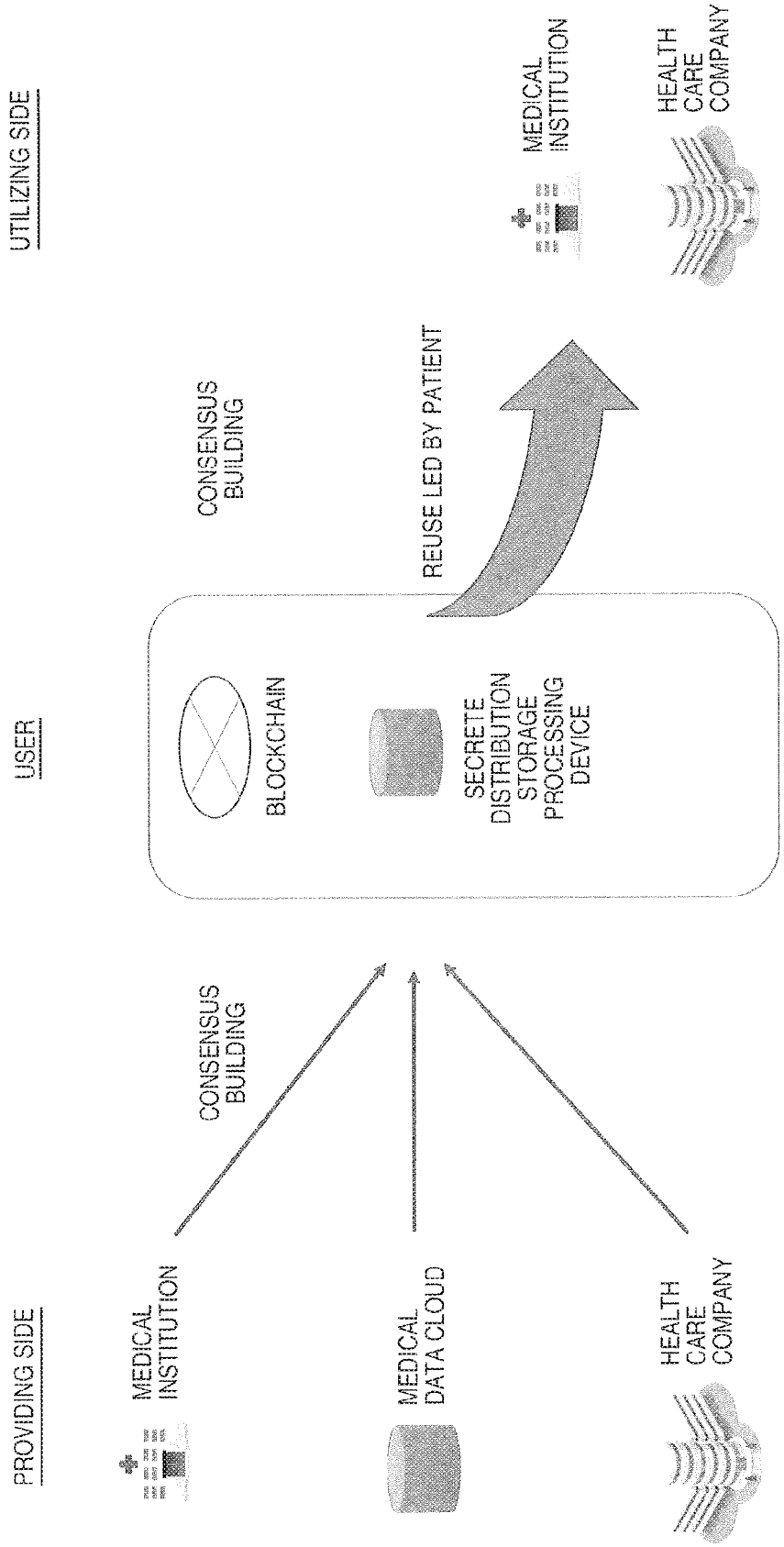

FIG. 10A

EXAMPLE OF BIODATA SET (TR_A, MA_A) OF "PHYSICAL EXAMINATION"

| TIME ORDER | TRANSACTION DATA (TR) | MASTER DATA TO BE GENERATED (MA) | ITEM NAME | DATA BODY SECTION | | | | |
|---|---|---|---|---|---|---|---|---|
| | | | | ITEM 1 | ITEM 2 | ITEM 3 | ITEM 4 | ITEM 5 |
| | | | | BMI (BODY MASS INDEX) (kg/m2) | LBM (LEAN BODY MASS) (kg) | HEIGHT (cm) | BODY FAT PERCENT- AGE (%) | WEIGHT (kg) |
| 1 | TR_A(1) | | | 22 | 45 | 162 | 7 | 53 |
| 2 | | MA_A(1) | | 22 | 45 | 162 | 7 | 53 |
| 3 | TR_A(2) | | | null | null | 165 | null | 55 |
| 4 | | MA_A(2) | | 22 | 45 | 165 | 7 | 55 |
| 5 | TR_A(3) | | | null | null | 165 | null | 58 |
| 6 | | MA_A(3) | | 22 | 45 | 165 | 7 | 58 |

EXAMPLE OF BIODATA SET (TR_B, MA_B) OF "VITAL"

| TIME ORDER | TRANSACTION DATA (TR) | MASTER DATA TO BE GENERATED (MA) | ITEM NAME | DATA BODY SECTION | | | |
|---|---|---|---|---|---|---|---|
| | | | | ITEM 1 | ITEM 2 | ITEM 3 | ITEM 4 |
| | | | | BLOOD PRESSURE (PA) | RESPIRA- TION RATE (TIMES/m) | HEART RATE (TIMES/m) | BODY TEMPERA- TURE (°C) |
| 1 | TR_B(1) | | | 100 | 50 | 53 | 36.3 |
| 2 | | MA_B(1) | | 100 | 50 | 53 | 36.3 |
| 3 | TR_B(2) | | | null | 49 | 52 | 36.5 |
| 4 | | MA_B(2) | | 100 | 49 | 52 | 36.5 |
| 5 | TR_B(3) | | | null | null | null | 36.2 |
| 6 | | MA_B(3) | | 100 | 49 | 52 | 36.2 |

FIG. 10B

GENERATION EXAMPLE OF NEW DATA SET "MA_C" FROM TWO TYPES OF MASTER DATA

| TIME ORDER | GENERATED MASTER DATA (MA) | MASTER DATA TO BE GENERATED ANEW (MA) | ITEM NAME | DATA BODY SECTION | | | | |
|---|---|---|---|---|---|---|---|---|
| | | | | ITEM 1<br>HEIGHT<br>(cm) | ITEM 2<br>WEIGHT<br>(kg) | ITEM 3<br>BLOOD PRESSURE<br>(PA) | ITEM 4<br>BMI (BODY MASS INDEX)<br>(kg/m2) | ITEM 5<br>BODY TEMPERA-TURE (°C) |
| 1 | MA_B(1) | MA_C(1) | | null | null | 100 | null | 36.3 |
| 2 | MA_A(1) | MA_C(2) | | 165 | 53 | 100 | 22 | 36.3 |
| 3 | MA_B(2) | MA_C(3) | | 165 | 53 | 100 | 22 | 36.5 |
| 4 | MA_B(3) | MA_C(4) | | 165 | 53 | 100 | 22 | 36.2 |
| 5 | MA_A(2) | MA_C(5) | | 165 | 55 | 100 | 22 | 36.2 |
| 6 | MA_A(3) | MA_C(6) | | 165 | 58 | 100 | 22 | 36.2 |
| | (TYPE OF MA) | | | (MA_A) | (MA_A) | (MA_B) | (MA_A) | (MA_B) |

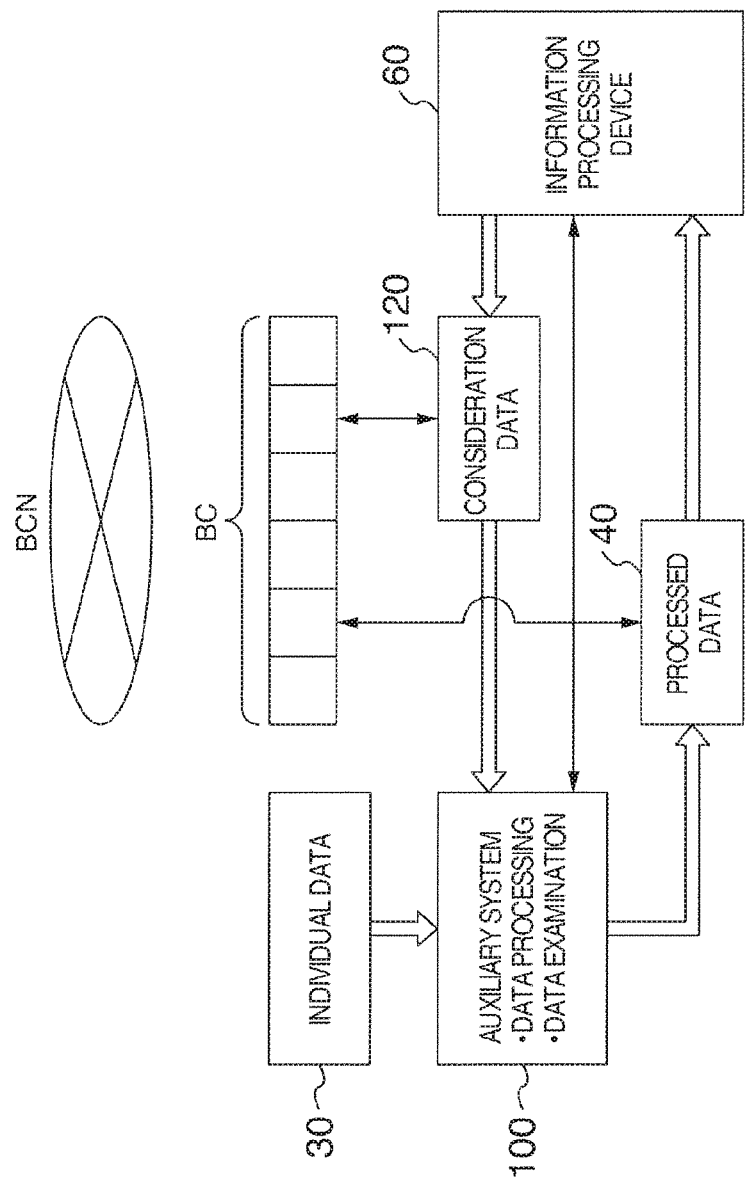

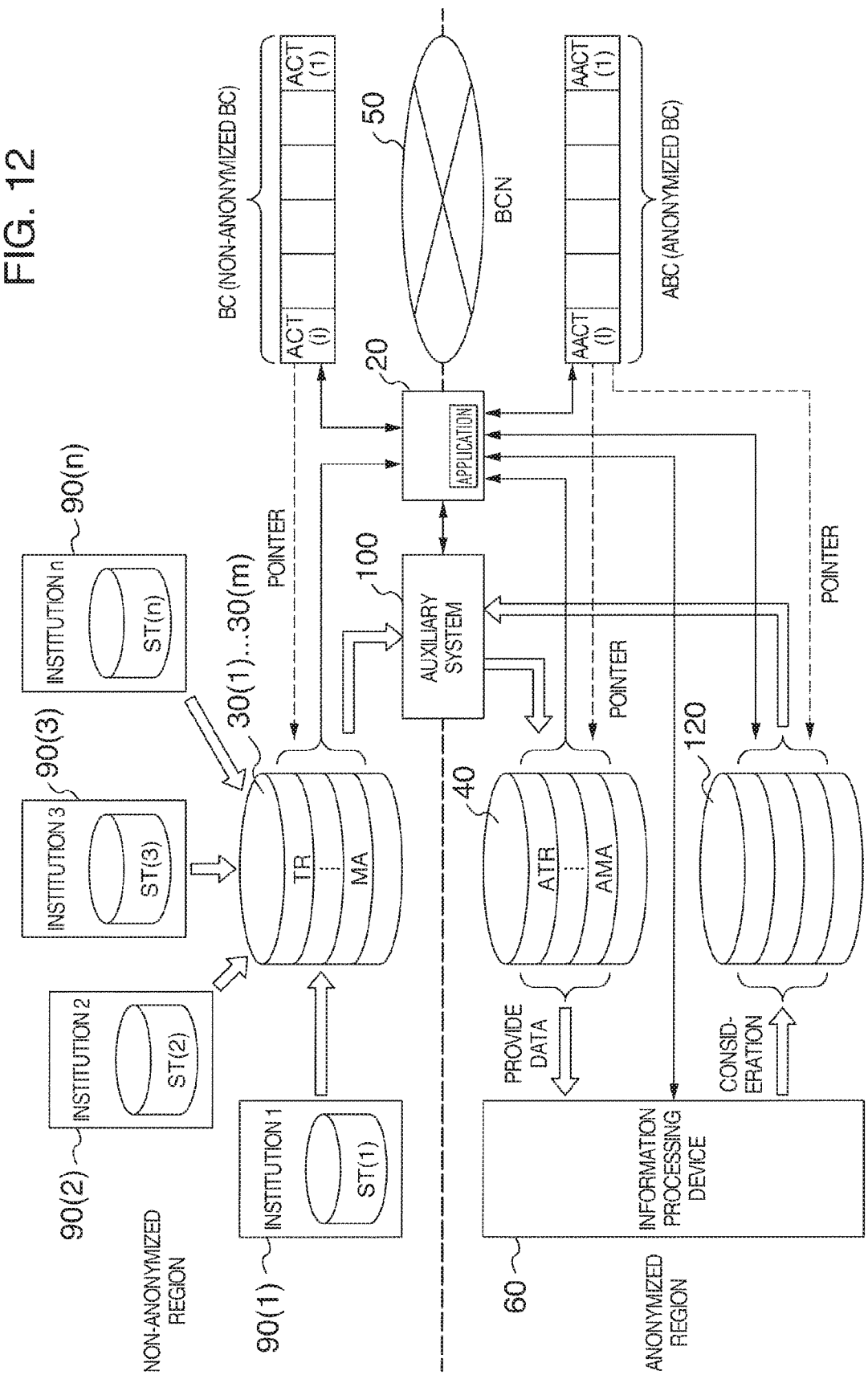

DATA USAGE METHOD, SYSTEM, AND PROGRAM THEREOF EMPLOYING BLOCKCHAIN NETWORK (BCN)

This application is a U.S. National Phase Application under 35 U.S.C. 371 of International Application No. PCT/JP2017/047345 filed on Dec. 28, 2017. This application is based on and claims the benefit of priority from Japanese Patent Application No. 2016-256339 filed on Dec. 28, 2016. The entire disclosures of all of the above applications are incorporated herein by reference.

TECHNICAL FIELD

The present invention relates to a data usage method, a system, and a program thereof utilizing a BCN (blockchain network).

BACKGROUND ART

The developments of information processing and communication have allowed information concerning an individual to be electronically accumulated as data every day through periodical or continuous monitoring of daily activities of the user.

The information is a variety of data such as data concerning health of the user and treatment in a hospital, individual medical data such as drug dosage, history information of daily shopping, and daily access information for retrieval of favorite information.

These kinds of information are accumulated as data together with time information and can be treated as so-called individual history data.

Various data generated according to such a variety of activities and the periodical or continuous monitoring are stored, depending on services related to the activities and the like, in storages used by processing systems that provide the respective services. For example, shopping information is stored while being distributed according to forms of purchases, that is, respective services such as shopping by credit cards, shopping by cash, and shopping by a debit card.

That is, such history data is managed by only providers that provide the services. Not that individual users of the services allow other institutions and providers to use history data in the past in different forms.

Therefore, the history data for each of the services are likely to be extremely biased content. Further, in a today's highly developed information system, history data mutually related among services is divided by systems that provide the respective services and is prevented from being utilized as data having mutual relationship.

Moreover, activity content of an individual changes at every moment depending on the individual's environment and often shifts to a service of a different provider. Therefore, if data serving as extremely important assets of the individual is divided by the different service, sufficient utilization of the data is hindered for the individual or companies and institution groups that are about to utilize the data anew.

On the other hand, individual data has to be extremely carefully treated in order to protect privacy of an individual. When information is simply spread, information concerning the individual is used for wrong purposes or damage to a partner is caused because of impersonation or the like. Serious damage could also occur if the information is falsified.

With the development of a machine learning technology called artificial intelligence (AI) technology as well in these days, data of an individual is processed to analyze taste of the individual and processing for automatically responding to an inquiry is widely performed. Health maintenance is most important for the quality of individual life. For example, there is known a system for providing medical data of an individual to an AI, which accumulates clinical data and the like, to propose a present disease name, possible diseases, a type of dosage, and the like.

In particular, a method of deep learning is utilized to learn characteristics of medical and health data from a large number of subjects and find out characteristic diseases of the respective subjects based on the medical and health data of the individual subjects.

Further, for quality of life regarded as important in these day, importance of not only care of diseases in a narrow sense but also health care related to life in general is increases. Data that can be treated is extremely extensive ranging from specific diseases such as a malignant tumor to mental disorders, stress, and the like, root causes of which are difficult to specify. Only with data on the current conditions of patients, it is often difficult to specify, even with the AI (machine learning), appropriate answers to the subject.

Moreover, it is not only difficult to perform the medical treatment but also difficult for individuals to select what kind of data is desirable to maintain quality of life adapted to characteristics of the individuals. Collection of such data as information by individuals involves extreme difficulty.

Further, it is also necessary to perform an analysis taking into account not only present data but also data in the past. There is a demand for a new system that performs such flexibly adapted data collection.

PATENT LITERATURE 1: Japanese Patent Application Publication No. 2016-218633

SUMMARY

Technical Problem

The present invention has been devised in view of such problems.

Therefore, the present invention provides a data utilization system, a data utilization method, and the like with which an individual can independently achieve utilization using individual data of the individual and further achieve concealing of the data.

Further, the present invention does not limit an object of the present invention and targets of data. However, for example, medical data, which is individual information, is also an asset of an individual. A patient is often treated in a plurality of hospitals because of many reasons such as a plurality of diseases and a change of residence.

Treatment data in a plurality of different medical institutions is an important treatment asset for the patient. If the treatment data can be integrally managed as medical data, the medical data can be variously utilized. Conversely, if the medical data is divided by the medical institutions and the like, treatment that is originally necessary is overlooked.

For example, information concerning how a patient has recovered or not recovered as a result of treatment and drug dosage continuously performed for a purpose of treatment of a certain disease is important information for not only the patient but also many medical institutions. This makes it possible to provide a further improved treatment method for other patient having similar diseases.

On the other hand, medical data is individual information and needs to be strictly managed. Further, reliability and confidentiality of genuine individual data and reliability and confidentiality of medical activity contents (for example, a treatment method and a dosage method) of a medical institution and an individual are also extremely important.

Therefore, the present invention provides a new method that can distribute genuine information by a genuine individual and provide a new method to make it possible to utilize the important information.

Further, the present invention provides a distribution infrastructure for appropriately processing existing individual data concerning medical treatment, health, and the like and safely achieving utilization of the individual data.

The present invention provides a new method and a new system that can effectively use data in human life and is capable of contributing to improvement of individual quality of life.

Further, the present invention provides a new method and a new system that can widely manage, in time series, data of individual behavior patterns for providing an appropriate answer corresponding to an individual change in order to prevent not only already suffering diseases but also occurrence of diseases and improve individual quality of life.

Solution to Problem

According to the present invention, there is disclosed a method for acquiring, with an information processing device used by an individual, data related to information concerning the individual and making it possible to utilize the data, the method including: a step of transmitting data concerning an address on a blockchain network used by the individual to a provision source of the data related to the information concerning the individual via a network; a step of registering, on the blockchain network, data for access (ACT) including data for specifying a location of data provided from the provision source of the data; and a step of acquiring the data related to the information concerning the individual by referring to the data for access (ACT).

Consequently, it is possible to use individual information with high confidentiality while using reliability through an address of the blockchain network.

Further, according to the present invention, the data provided from the provision source includes at least any one of identification information of the individual, identification information of the information processing device used by the individual, and identification information of the provision source.

Further, according to the present invention, the data provided from the provision source includes information indicating generation time of the data. It is possible to refer to a temporal history of the data.

Further, according to the present invention, the data provided from the provision source is a data set including data concerning a plurality of respective data items generated based on a plurality of data, which are history data concerning the individual.

Further, according to the present invention, in the data utilization method, each of the plurality of data items is configured to indicate latest data in the data set of the history data and can be provided as immediate latest information.

Further, according to the present invention, at least the data related to the information concerning the individual is hashed by a hash function and registered in a blockchain.

The present invention further provides a system for acquiring, with an information processing device used by an individual, data related to information concerning the individual and making it possible to utilize the data.

The information processing device of the system according to the present invention includes at least a memory or a storage device connected to the information processing device and has: a function of transmitting data concerning an address on a blockchain network used by the individual to an information processing device on a provider side of the data related to the information concerning the individual via a network; a function of referring to, from the provider-side information processing device, data for access (ACT) including data for specifying a location of data provided from a provision source of the data; and a function of acquiring, based on the data for access (ACT), the data related to the information concerning the individual.

Further, according to the present invention, the data provided from the provision source includes identification information of an individual permitted to use the data.

Further, the data provided from the provision source includes at least identification information of the information processing device used by the individual, identification information of the provision source, and information indicating generation time of the data.

The data provided from the provision source is a data set including data concerning a plurality of respective data items generated based on a plurality of data, which are history data concerning the individual. For example, each of the plurality of data items indicates latest data in the data set of the history data.

At least the data related to the information concerning the individual is hashed by a hash function.

Further, the present invention provides a program for acquiring data related to information concerning an individual, the program being stored in an information processing device used by the individual and executed by a first information processing device, and a storage medium storing the program, the program being configured to be executed by the information processing device to be capable of acquiring, by referring to data for access (ACT) registered on a blockchain network based on a blockchain address provided from the information processing device, at least data related to the information concerning the individual stored in a storage device usable by the information processing device or another information processing device.

The data related to the information concerning the individual includes identification information of the individual.

Further, the data related to the information concerning the individual includes at least identification information of the information processing device used by the individual, identification information of the provision source, and information indicating generation time of the data.

The method disclosed in this application further includes: a step of generating, based on data related to information concerning an individual referred to by an access ticket (ACT), processed data with an auxiliary system communicable by an information processing device used by an individual; a step of transmitting, with at least one of the auxiliary system or the information processing device used by the individual, the processed data and inquiry data of the individual to an information processing device or an information processing system of a third party; and a step of acquiring or referring to, with the information processing device used by the individual, answer data from the information processing device or the information pressing system of the third party.

Further, in the method disclosed in this application, the auxiliary system acquires the data related to the information concerning the individual by referring to data for access (ACT) on a blockchain network.

The auxiliary system is operated by an expert related to the data or operated via the information processing device used by the individual and configured to be capable of generating the processed data from the data related to the information concerning the individual according to inquiry content of the individual. Alternatively, the auxiliary system is implemented with an expert system or an artificial intelligence system related to the data and configured such that the processed data is generated by the expert system or the artificial intelligence system.

In addition, the system disclosed in this application further includes an auxiliary system communicable by an information processing device used by an individual. The auxiliary system is configured to be capable of generating processed data based on data related to information concerning the individual referred to by the access ticket (ACT) and configured such that the processed data and inquiry data of the individual are transmitted to an information processing device or an information processing system of a third party by at least one of the auxiliary system and the information processing device used by the individual and answer data from the information processing device or the information processing system of the third party is acquired or referred to by the information processing device used by the individual or the auxiliary system according to the inquiry data.

Further, the auxiliary system may be configured to be capable of acquiring the data related to the information concerning the individual by referring to data for access (ACT) on the blockchain network and operated by an expert related to the data or operated via the information processing device used by the individual and configured such that the processed data is generated from the data related to the information concerning the individual according to inquiry content of the individual, or the auxiliary system may be implemented with an expert system or an artificial intelligence system related to the data and configured such that the processed data is generated by the expert system or the artificial intelligence system.

In addition, this application discloses a program and a storage medium storing the program. The program is configured to execute an auxiliary system communicable by an information processing device used by an individual such that the auxiliary system communicable by the information processing device used by the individual generates processed data based on data related to information concerning the individual referred to by data for access (ACT) to a blockchain on a blockchain network, transmits the processed data to an information processing device or an information processing system of a third party, and is capable of acquiring or referring to answer data from the information processing device or the information processing system of the third party.

The program may execute the auxiliary system to be capable of acquiring the data related to the information concerning the individual by referring to the data for access (ACT) on the blockchain network. The program may be configured to execute the auxiliary system such that the auxiliary system is operated by an expert related to the data or operated via the information processing device used by the individual and is capable of generating the processed data from the data related to the information concerning the individual according to inquiry content of the individual or may be configured to execute the auxiliary system such that the processed data is generated by an expert system or an artificial intelligence system related to the data implemented in the auxiliary system.

BRIEF DESCRIPTION OF DRAWINGS

FIG. 9 is a conceptual diagram in which medical data is applied to the individual asset data utilization system according to the present invention.

FIG. 10A shows an example of data body sections of transaction data (TR) and master data (MA) generated from the transaction data (TR).

FIG. 10B shows an example of a data body section of new master data (MA) generated from different types of transaction data.

FIG. 11 shows an example of a system configuration for processing data stored in a storage device 30 and delivering the data to another information processing device 60.

FIG. 12 shows an example of a system configuration for concealing information concerning an individual, which should be concealed, and providing the concealed information to the information processing device 60 based on the configuration shown in FIG. 11.

DESCRIPTION

Figure 1:
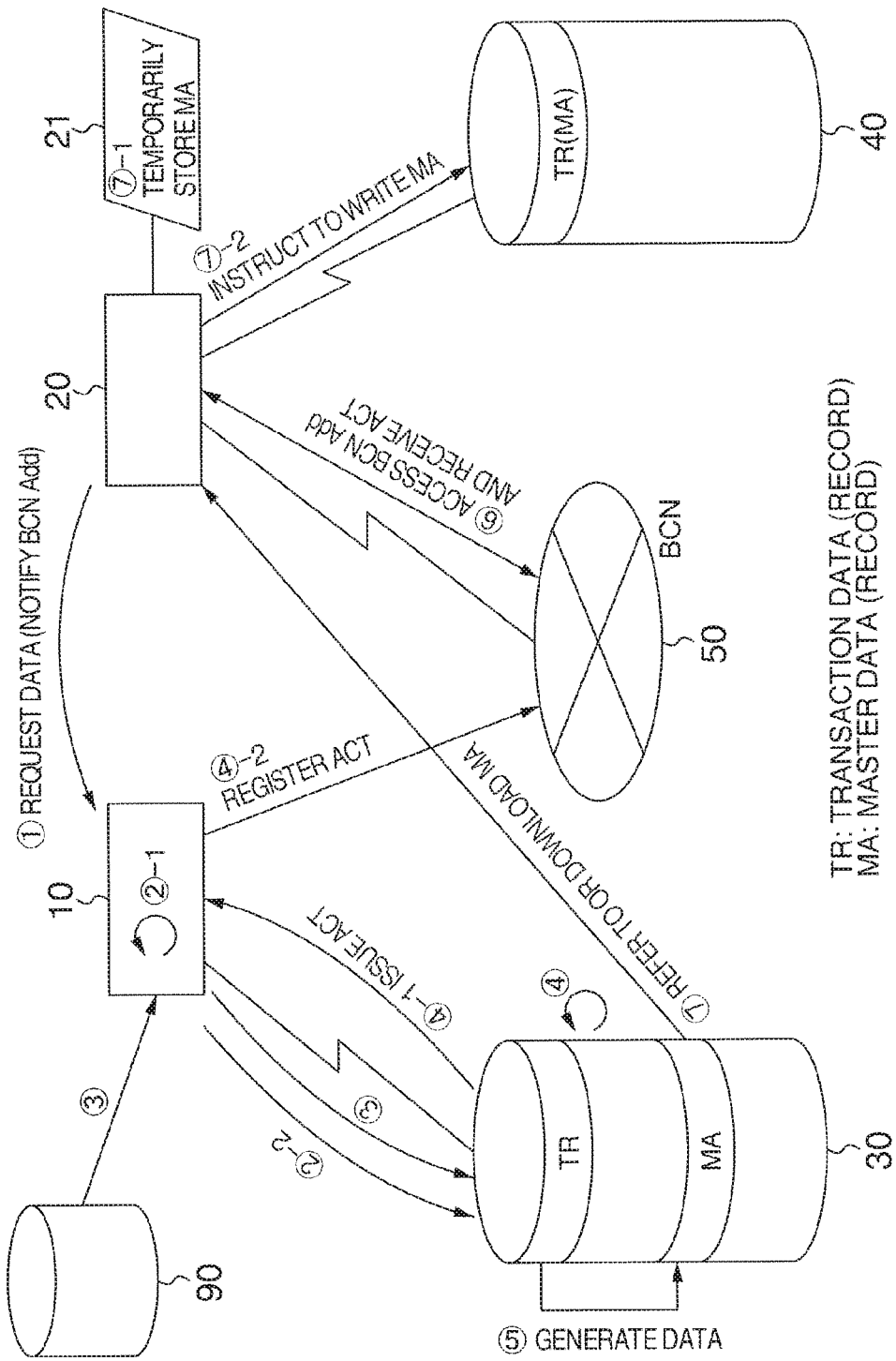
FIG. 1 is a schematic diagram showing an embodiment of an individual asset data utilization system according to the present invention.

The present invention uses a blockchain, which is a core technology of a bitcoin and the like, which are virtual currencies. The blockchain is a distributed register for recording, as chain-like blocks, records (blocks) of transactions generated in a network. The individual blocks of the transactions are recorded in the register as legitimate blocks linked like a chain by storing, on the inside of the blocks, in addition to contents of the transactions, hash values of contents of blocks generated before the blocks.

When a new block is added to the blockchain, it is guaranteed that a chain of blocks, legitimacy of which is verified, is formed by causing a miner to perform mining.

When consensus building by the mining is performed, the chain by the legitimate blocks is distributed and accumulated in a database and prevention of falsification and security of data are guaranteed. Note that there has been known a method of giving a reward to a participant in the mining who first confirms whether illegality is absent in content of a transaction among participants in the mining and giving authority to update the database to the participant. However, a mining method is not limited. Any mining method can be adopted if consensus building of legitimacy can be obtained and an illegal block is less likely to be inserted into the chain.

As the blockchain, besides an open type (or a public type) used in bitcoins, a closed type (a private type) blockchain that limits participants is known. In the present invention, the blockchains of both the types can be used. There are various forms as the blockchain in this way. However, the blockchain is not limited if the present invention can be carried out.

Respective transactions can be performed using, for example, P2P communication. The P2P communication can use, for example, the Internet, a mobile communication network, and a dedicated communication line. However, this is illustration. Communication other than the P2P communication may be used. As an information processing device that performs a transaction, a personal computer and portable information processing devices such as a smartphone and a tablet can be used. However the information processing device is not limited to this.

A technology using a blockchain is used in a bitcoin, which is a virtual currency. In a transaction register of the virtual currency, blocks of transaction data of the virtual currency (for example, an amount of a virtual currency set as a transaction target, a payment destination address of the virtual currency of a user, a public key used to generate the payment destination address of the user, a hash value of a basic fund or the like of the currency) are created and recorded on a chain in a blockchain network.

Security of the transaction data is guaranteed by using the hash value and a public key encryption system. The transaction data is widely distributed in order to cause the miner to verify legitimacy, whereby legitimacy of the transaction data is monitored.

The present invention uses the blockchain to, while using legitimacy of blocks recorded in a register of the blockchain, facilitate use of data referred to in the blocks. For example, by using the blockchain, in order to achieve confidentiality of data while guaranteeing legitimacy of a history of transactions of data, the use may be limited to predetermined permitted specific users or specific users and specific information processing devices. As data stored in the blockchain, it is possible to adopt a configuration in which actual transaction target data is absent in blocks of the blockchain and the blocks have structure or data, for example, a pointer that can refer to the actual transaction target data.

FIG. 1 shows an example of the configuration of an asset data usage system 1 according to the present invention.

As a premise, between a user of an information processing device 20 for the user and a user of the information processing device 10, it is necessary to build, for the user, consensus of provision of information concerning the user used or managed the an information processing device 10 for a provider.

By building the consensus, the information processing device 10 for the provider can provide activity data of the user to the user.

In the information processing device 20 used by the user, authentication registration of the user individual is completed in advance. A user identifier (UID), which is identification information of the user, is allocated to the information processing device 20. Further, a terminal (device) identifier DID, which is identification information of the information processing device 20 for the user, is further uniquely registered in the information processing device 20 for the user.

Further, for the user, a blockchain address (also referred to as "BCN address" or "BCN Add" for simplification) for enabling register entry on a blockchain (BCN 50 in FIG. 1) is registered in advance. Data communication is set up to be electronically possible by the information processing device 20 for the user and the information processing device 10 for the provider respectively between the user and the provider.

A step for providing activity data of a user individual to the user is explained below.

In parallel to or before or after step (3), in order to disclose an address of the user on the blockchain network (BCN 50) to the provider, the user transmits a BCN address (BNC Ads) of the user from the information processing device 20 of the user to the information processing device 10 for the provider (step (1)).

If data related to the user is stored in a certain storage device 90, in response to step (1) or independently from step (1), the information processing device 10 for the provider acquires the data of the user from the storage device 90, which is a storage place of the data (step (3)). The information processing device 10 for the provider generates, from the received data, a data set of actual values (data) corresponding to one or a plurality of data items according to a predetermined data format (step (2)-1) and stores the data set in (uploads the data set to) the storage device 30 as transaction data (TR) (step (2)-2).

What kinds of item are added as elements of the data set is determined as appropriate according to a condition such as consensus content between the user and the provider or an item that the provider can provide, or an item desired by the user.

In the information processing device 10 for the provider and the information processing device 20 for the user, application programs for selection for data provision by the information processing devices is stored in memories of the information processing devices. The application programs are executed by the respective processing devices. Data items added to the transaction data (TR) are selected. In response to the selection, data corresponding to the data items is dropped into the transaction data (TR) according to a predetermined format.

Content of the actual data dropped into the transaction data (TR) is described in a format that can be read according to an item of the data as the transaction data (TR). Therefore, besides the information processing device 10 for the provider, the information processing device 20 for the user and a terminal of a third party can read the data. As the format, for example, a JSON format can be used.

The information processing device 10 for the provider further includes a program for generating the transaction data (TR) and generating the master data (MA) from the transaction data (TR). Note that the information processing device 10 for the provider is a side that performs provision of data to the user and the user is a side that receives the data. However, as explained below, the user can be a side that can provide the received data. Therefore, functions of the application programs of the information processing device 20 for the user and the information processing device 10 for the provider may be different. However, the information processing device 20 for the user and the information processing device 10 for the provider do not need to always include the application programs having different functions. The information processing device 20 for the user and the information processing device 10 for the provider can include application programs having the same function or application programs for executing any one of functions explained below. That is, it should be recognized that another information processing device for a purpose of use of a function explained about a certain information processing device is likely to have the function. A storage device may take over execution of a part of the functions, for example, the generation of the transaction data (TR) and the master data (MA).

When receiving the BCN address (BCN Add) of the user in step (1), the information processing device 10 for the provider transmits the BCN address (BCN Add) and a data resource identifier (SID) for specifying a data resource to the storage device 30. The information processing device 10 for the provider receiving the BCN address (BCN Add) and the data resource identifier (SID) generates an access ticket (ACT). Note that, if a provision source of data can be specified, the data resource identifier (SID) is not limited to a terminal (device) identifier DID of the information processing device 20 for the user and may be an identifier of the storage device 30. Data is sometimes widely distributed and present in the storage device as in a secret distribution storage device. However, the data resource identifier (SID) may be any identifier if the data in the storage device can be referred to.

The access ticket (ACT) is data to be recorded in a blockchain of the user.

Figure 3:
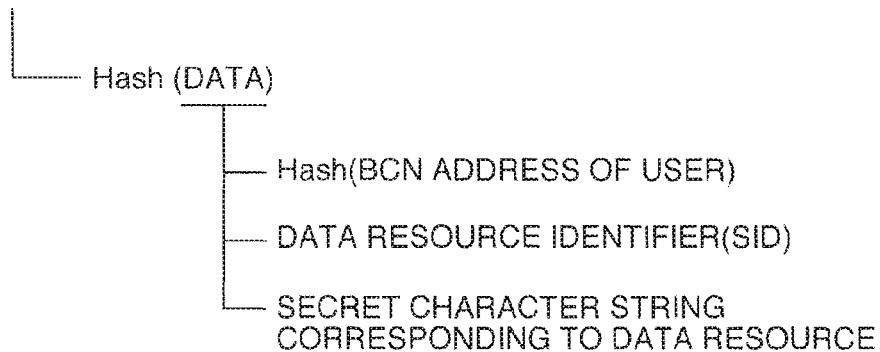
FIG. 3 shows an example of a data configuration of an access ticket (abbreviated as "ACT") issued as data for access when, in the storage devices shown in FIG. 1, the individual data is provided to a system other than a system that manages the individual data.

FIG. 3 is a data configuration diagram of the access ticket (ACT) in an embodiment according to the present invention.

The access ticket (ACT) is a hash value of predetermined data adapted to a blockchain. Data serving as elements of the access ticket (ACT) is a hash value of the BCN address (BCN Add) of the user, a data resource identifier (SID), and a secrete character string corresponding to the data resource identifier (SID). The hash value, the data resource identifier (SID), and the secrete character string are hashed by a hash function. A 128-bit hash value is obtained by using, for example, MD5 as the hash function. Consequently, the access ticket (ACT) is entered in the blockchain network (BCN) as a fixed-length access ticket (ACT). Note that, although not shown in FIG. 1, the information processing device 10 for the provider may separately inform the issuance of the access ticket (ACT) to the information processing device 20 for the user. Registration in the blockchain network (BCN) may be performed through the information processing device 20 for the user.

Since the data is issued, data from the data resource identifier (SID) is prepared for the user. It is indicated that the user has authority for obtaining the data.

The user becomes capable of accessing, with the access ticket (ACT), the transaction data (TR) and the master data (MA) generated from the transaction data (TR) present in the storage device 30 managed by the information processing device 10 for the provider.

The transaction data (TR) and the master data (MA) have a predetermined format in order to enable reference to and operation of data by the user and provision of the data to another third party.

Original data for the provider to provide data is often separately present as activity data at different times of the user. Therefore, a plurality of transaction data (TR) that are the same type but correspond to the respective original data may be prepared. The original data for the provider to provide data also includes activity data of different types. Recording items of the data are sometimes different from each other. Therefore, different transaction data (TR) having the same basic form but having different record lengths and different data items to be recorded may be prepared.

Individual data is not always requested once from the information processing device 20 for the user. The individual data is sometimes requested to the information processing device 10 for the provider at time intervals such that individual data generated every time activity is performed can be received.

In this way, the transaction data (TR) generated by the storage device 30 can be generated as one or a plurality of transaction data (TR).

In FIG. 1, to simplify explanation, an example is explained in which one master data (MA) is created from one transaction data (TR) and provided to the user.

The storage device 30 includes a program or a macro command stored in a not-shown memory. The program or the macro command is executed by a processing device included in the storage device 30. Note that the program includes the macro command. The macro command is only separately used to make explanation clear for convenience.

When receiving, from the information processing device 10 for the provider, the BCN address (BCN Add) and the data resource identifier (SID) indicating the data provision source of the data to the information processing device 20 for the user, the program or the macro command generates the access ticket (ACT) based on information of the BCN address (BCN Add) and the data resource identifier (SID (step (4)). Note that the storage device 30 may generate the master data (MA) based on the transaction data (TR) (step (5)). The program or the macro command returns the access ticket (ACT) to the information processing device 10 for the provider (step (4)-1).

As explained above, the access ticket (ACT) gives authority for enabling the user to refer to and download the data used or managed by the information processing device 10 for the provider. The access ticket (ACT) is issued via the information processing device 10 for the provider (step (4)-2).

A transmission destination of the access ticket (ACT) is the BCN address (BCN Add) of the user provided from the information processing device 20. The user can acquire the access ticket (ACT) through the information processing device 20 for the user by accessing the BCN 50 (step (6)).

The data resource identifier (SID) is stored in the acquired access ticket (ACT). Therefore, the user can download the master data (MA) to the memory 21 of the information processing device 20 for the user referring to information of the master data (MA) stored in the storage device 30 based on information of the data resource identifier (SID) via the information processing device 10 for the provider or directly (step (7)).

Figure 2:
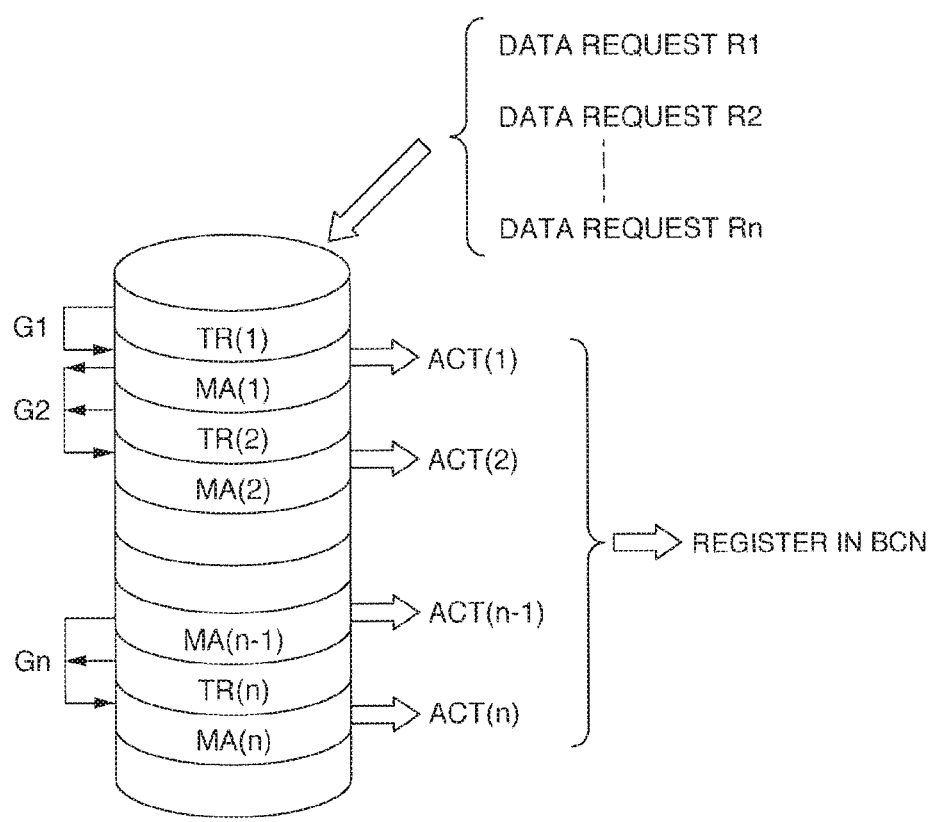
FIG. 2 shows a conceptual diagram in the case in which individual data is updated in a storage device functioning as an information provision resource and a storage device used by a user shown in FIG. 1.

As explained above, the transaction data (TR) is not always one transaction data. A plurality of transaction data TR(1) to TR(n) generated in time series could be present. A plurality of data requests R1 to Rn may be received at time intervals according to separate requests from the user. FIG. 2 shows a conceptual diagram in which the plurality of data requests R1 to Rn are received and master data MA(1) to MA(n) are generated by generation processing G1 to Gn respectively corresponding to the data requests R1 to Rn.

Each of the generated master data MA(1) to MA(n) may be provided to the user as an added asset. The access ticket (ACT) may be transmitted to the BCN address (BCN Add) in response to the data requests R1 to Rn such that the user can refer to and acquire the master data MA(1) to MA(n). The user may be enabled to access the master data MA(1) to MA(n).

In the bitcoin, a token of a transaction is issued to a BCN to form a blockchain of the token as a register. Blocks are linked in time series of the transaction. On the other hand, in an example according to the present invention, a chain of blocks of the access ticket (ACT) is registered in a register. The blocks are linked in time series.

Figure 4:
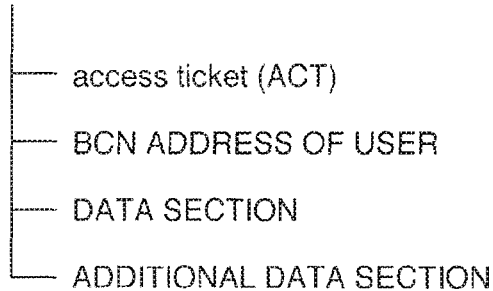
FIG. 4 shows an example of a data configuration of master data (MA) and transaction data (TR) concerning individual information created in the storage device shown in FIG. 2.

FIG. 4 is a data configuration diagram of the transaction data (TR) and the master data (MA) in the embodiment according to the present invention.

Components of the transaction data (TR) and the master data (MA) include content of the access ticket (ACT) issued to the user in order to indicate that the transaction data (TR) and the master data (MA) are data generated in response to a request of the user.

The user can obtain, with the information processing device 10 for the provider, an access right to the master data (MA) using the access ticket (ACT). The access ticket (ACT) includes information of the data resource identifier (SID) (see FIG. 3). The information processing device 20 for the user is capable of accessing data referring to the information.

Basic components of the master data (MA) and the transaction data (TR) include a data section and an additional data section other than the access ticket (ACT) (see FIG. 4).

Figure 5A:
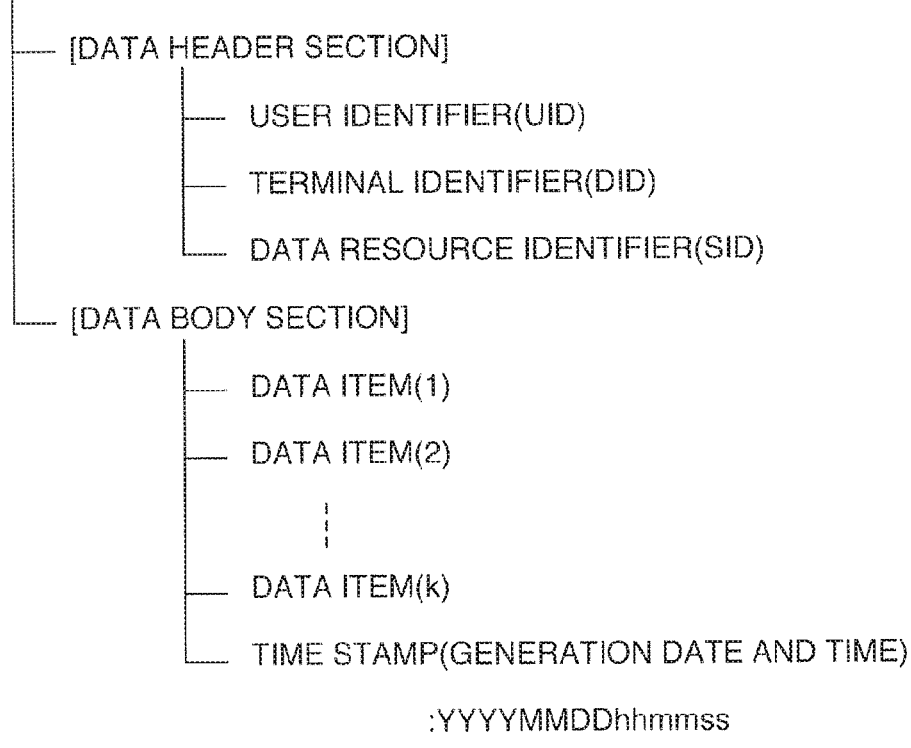
FIG. 5A shows an example of a data configuration of a data section, which is a data component, of the master data (MA) and the transaction data (TR) shown in FIG. 4.

FIG. 5A shows components of a data section of the master data (MA) and the transaction data (TR). The data section can be divided into a data header section and a data body section.

The data header section is configured from a user identifier (UID), a terminal (device) identifier DID, and a data resource identifier (SID).

On the other hand, the data body section is configured from data (values) of 1 to k items of the individual. A value of k is any number. Therefore, a data length of the data section does not need to be fixed. In the data body section, a timestamp indicating date and time when the transaction data (TR) or the master data (MA) is created is further provided. Consequently, it is possible to manage the transaction data (TR) and the master data (MA) in generation order.

Figure 5B:
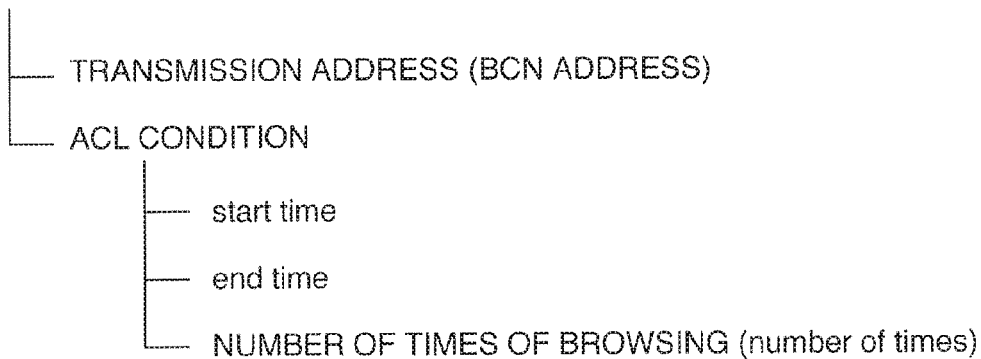
FIG. 5B shows an example of a data configuration of an additional data section, which is a data component, of the master data (MA) and the transaction data (TR) shown in FIG. 4.

FIG. 5B further shows additional data. The additional data is configured from a transmission address indicating a transmission destination of data (for example, the BCN address of the user) and ACL conditions defining browsing conditions (access conditions) for the data.

The ACL conditions include "start time" indicating an accessible first time, "end time" indicating an accessible last time, and "number of times of browsing" for limiting the number of times of browsing. Note that the access conditions are an example and may be configured from a variety of access conditions or combinations of the access conditions. In the information processing device, an application program capable of providing an interface with which the user can input these conditions may be provided such that the user can set these conditions.

Note that both of the transaction data (TR) and the master data (MA) are explained above. However, both the data do not always need to have the same configuration. A data type item for easily distinguish the transaction data (TR) or the master data (MA) may separately added to each of the transaction data (TR) and the master data (MA). The additional data may be separated and stored in the storage device 30 without being included in the data configuration of the transaction data (TR) and the master data (MA). When the additional data is separated, the additional data is enabled to be associated with the transaction data (TR) or the master data (MA) and is managed by a program of the storage device 30 or an application program of the information processing device 10.

The above explanation is based on the premise that individual authentication is already performed. However, the information processing device 10 for the provider and the information processing device 20 for the user have a function of authenticating whether a person about to use the terminal is a legitimate user. For example, the information processing device 20 for the user has a biological authentication function such as fingerprint or voiceprint authentication or blood vessel authentication and uniquely associates authentication data of the authentication and an individual to achieve personal authentication. When the personal authentication is performed and the person is specified as the legitimate user, the application program installed in the information processing device 20 permits execution of the application program.

As shown in FIG. 1, the asset data usage system 1 provides data from the information processing device 10 to the information processing device 20 using the information processing device 10 for the provider of the data and the information processing device 20 for the user of the data.

Figure 6:
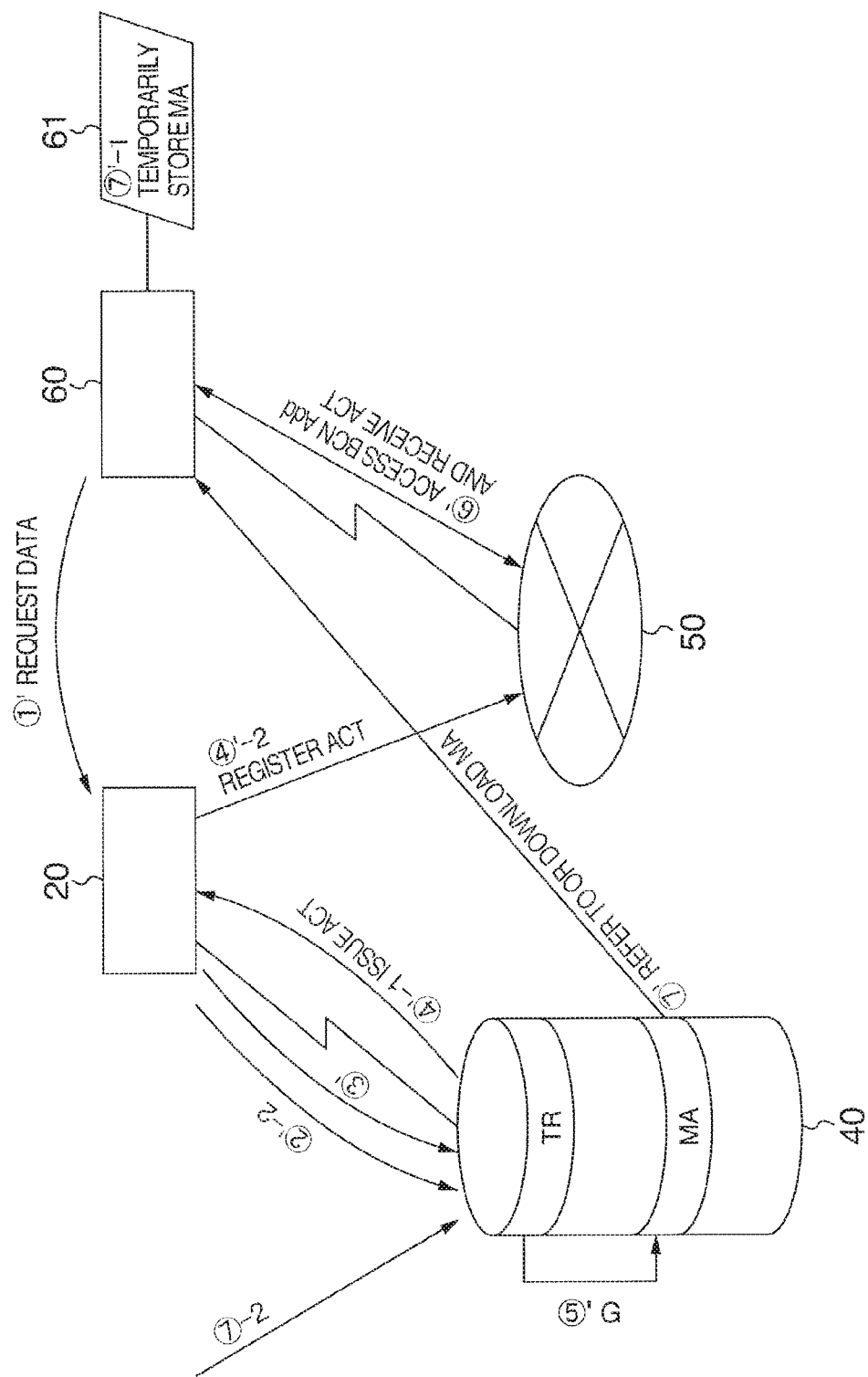
FIG. 6 is a schematic diagram showing an embodiment of the individual asset data utilization system according to the present invention in which received master data (MA) is provided to another person (individual, institution, group, or the like).

Further, as shown in FIG. 6, the asset data usage system 1 may include an information processing device 60 for a third party for, when data is provided to the information processing device 20 for the user, further separately providing the data. A process of provision of data from the information processing device 20 for the user to the information processing device 60 for the third party is basically the same as the process of the provision of data from the information processing device 10 for the provider to the information processing device 20 for the user. Note that, if data is simply provided, a BCN address (BCN Add) only has to be the BCN address (BCN add) used by the user. An access ticket (ACT) is the access ticket (ACT) created by the storage device 40 for the user.

The BCN address (BCN Add) can be generated by the application program of the information processing device 20 for the user. The access ticket (ACT) can be generated from information of the terminal (device) identifier DID of the information processing device 20 for the user. Specifically, in a relatively early stage before provision of data from the user is performed, the BCN address (BCN Add) and the access ticket (ACT) are generated as explained below.

First, the local application program of the information processing device 20 for the user transmits a user identifier (UID) to the storage device 40 for the user and instructs generation of a secret key. A program or a macro command stored in the storage device 40 for the user performs generation of a public key and a secret key in response to the instruction. In response to the generation of the public key and the secret key, the application program of the information processing device 20 for the user generates a BCN address (BCN Add). The storage device 40 for the user receives and hashes the generated BCN address (BCN Add), generates hash values of a hash value of the BCN address (BCN Add), a data resource identifier (SID) indicating the terminal (device) identifier DID of the information processing device 20 for the user, and a secret character string of the data resource identifier (SID) and sets the hash values as an access ticket (ACT). Note that, as explained above about the storage device 30, if the data of the storage device 40 for the user can be referred to, the data resource identifier (SID) does not always need to be the terminal (device) identifier DID of the information processing device 20 itself and may be an identifier of the device itself of the storage device. Alternatively, information that can specify data according to a secret distribution storage only has to be used.

Referring back to the data transmission from the information processing device 20 for the user to the information processing device 60 for the third party, the access ticket (ACT) can be notified to the information processing device 60 for the third party. At the same time, master data (MA) to be provided to the information processing device 60 for the third party is generated from the transaction data (TR).

The information processing device 60 for the third party can acquire data of the master data (MA) in the storage device 40 for the user via the BCN address (BCN Add). The third party is capable of storing the data in a storage device used in the information processing device 60 and achieving common use of the data according to necessity.

Figure 7:
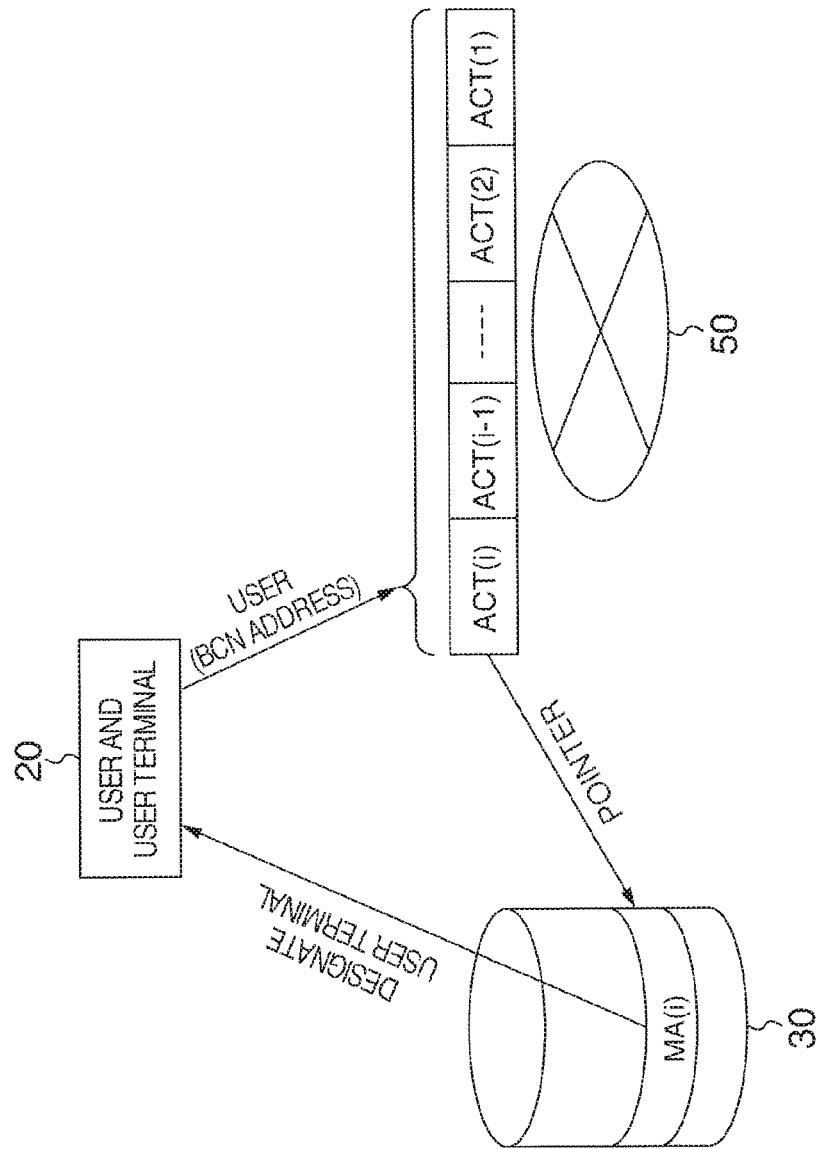
FIG. 7 is a conceptual diagram showing a mutual relation between a user and a storage device at a data provision source for the user and chained access ticket, an issuance history of which is linked like a chain in a blockchain 50.

FIG. 7 shows a relation of mutual linkage by contents of the access ticket (ACT) registered in the blockchain 50 and the terminal (device) identifier DID and the user identifier (UID) of the information processing device 20 for the user and the master data (MA) of the storage device 30.

A data resource identifier (SID) is described in a plurality of access tickets (ACT) linked like a chain. The data resource identifier (SID) functions as a pointer for substantially designating the storage device 30 managed by the information processing device 10 for the provider. Further, in the master data (MA) recorded in the storage device 30, a user identifier (UID) and a terminal (device) identifier DID are described as elements of a data header section. The user identifier (UID) and the terminal (device) identifier DID function as pointers of the information processing device 20 for the user.

The information processing device 20 authenticates the user with the user identifier (UID) and generates a BCN address (BCN Add) with the user identifier (UID). The user identifier (UID) is a pointer of the access ticket (ACT) on the BCN address (BCN Add).

Such a relation is maintained. Consensus concerning legitimacy of the access ticket (ACT) is built on the BCN address (BCN Add). Further, the storage device 30 and the storage device 40 that store the transaction data (TR) and the master data (MA) are desirably secret distribution storage devices. Since data is distributed and managed, confidentiality and security of the data are further maintained.

An environment for providing data is already arranged on the blockchain 50 for the information processing device 20 for the user. Every time the information processing device 20 for the user posts data of a predetermined form based on specifications of the environment to the blockchain 50, a chain of the data is formed by a hash value on the blockchain 50. Security of the data is secured.

Since a size of the data provided on the data chain is limited, actual data corresponding to the data can be stored in the storage device 30 or the storage device 40 for the user.

Figure 8:
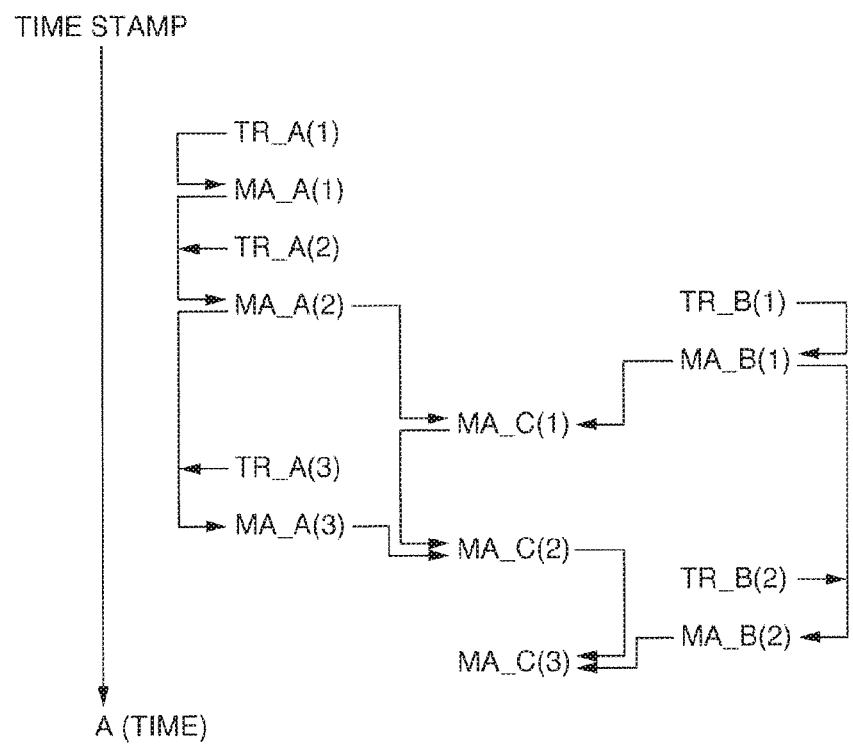
FIG. 8 shows a conceptual diagram for generating master data from different types of transaction data generated in time series and for combining different types of master data (MA).

FIG. 8 is a conceptual diagram for generating master data from transaction data of different types generated in time series, performing merging of the master data (MA) of the different types, and generating new master data (MA).

The vertical axis indicates elapse of time. The time can be set to, for example, time when the transaction data (TR) and the master data (MA) are generated. The time is indicated by a timestamp, which is a data element of the time. As the transaction data (TR), two types of transaction data TR_A (m) and TR_B(n) (m and n indicate numbers in elapsed time order) are generated. Every time the transaction data TR_A (m) and TR_B(n) are generated, master data MA_A(m) and MA_B(n) are generated. Further, when master data (MA) of different types are respectively generated, the generated master data (MA) is merged and new master data MA_C(h) (h indicates a number in elapsed time order) is generated. Note that, as it is understood from this, the master data (MA) is also used as the transaction data (TR) for generating the next master data (MA).

Referring to FIG. 1, the transaction data TR_A(m) and TR_B(m) are sometimes generated in the storage device 30 used by the information processing device 10. However, it is also likely that the transaction data TR_A(m) and TR_B (m) are generated in a different storage device used by a different information processing device. That depends on how the data of the user is managed on the outside.

When the transaction data TR_A(m) and TR_B(n) of different types are generated in the same storage device, for example, master data MA_C(h) merged by the same user identifier (UID) may be generated in the same storage device. Alternatively, the master data (MA) (for example, MA_A(2) and MA_B(1)) obtained from the transaction data (TR) of the same type by the method explained above may be stored in the storage device 40 used by the information processing device 20 for the user. The master data (MA) (for example, MA_C(1)) obtained by merging the master data (MA) may be generated.

The merged master data (MA) is different from an existing data resource because the storage device side in which the master data (MA) is generated becomes a new resource. Therefore, the data resource identifier (SID) is changed to a data resource identifier (SID) with which the master data (MA) generated anew can be referred to.

In this way, a plurality of types of transaction data (TR) can be acquired from the same data resource or from a plurality of data resources. Since the plurality of types of transaction data (TR) can be acquired from the plurality of data resources, the transaction data (TR) can be used as new data that complements data of the data resources each other. A rule of the merging is different depending on with what kind of data the merging is performed. The rule only has to be determined as appropriate according to an item of data. For example, a new master data (MA) can be generated in which a new data item indicating a different indicator is created from a data item of master data (MA) of a type different from certain master data (MA). Examples of the generation of the new data item includes merging respective data from a data resource concerning exercise data and a data resource concerning meal data to generate new data including calorie calculation.

As it is understood from FIG. 1 and FIG. 6 and the explanation of the figures, the application program of the information processing device 20 for the user can include two large functions of reception of data from the information processing device 10 (including the storage device 30) for the provider and provision of data to the third party. For the reception of the data, it is possible to refer to an access ticket (ACT) or a history of the access ticket (ACT) transmitted from the information processing device 10 for the provider through the blockchain and perform acquisition of data from the information processing device 10 for the user or upload data included in a processing device of the user to a storage device (desirably a secrete distribution storage; the same applies below) used by the processing device of the user. As explained above, the information processing device 20 for the user is also capable of providing data like the information processing device 10 for the provider. The information processing device 20 for the user can include a function of not only generating data using a BCN address (BCN Add) of the user and providing the data to the third party but also providing the data using a BCN address (BCN Add) of the partner. The user may confirm distributed slips chained by the BCN address (BCN Add) of the user to make it possible to preview even a history of the distributed slips.

It is undesirable to cause a normal user to perform such fine steps of the processing. Therefore, to prevent complication for a user, a user interface for grouping a series of procedures on a display screen of the information processing device 20 for the user to enable the user to perform the series of procedures with one button or perform the series of procedures with simple operation is provided by an application program.

FIG. 9 is a conceptual diagram of a medical information utilization system for achieving utilization of medical data as one of examples according to the present invention. The medical information utilization system is configured to acquire the plurality of types of transaction data (TR) shown in FIG. 8 from different institutions.

A center portion of FIG. 9 indicates a user. A medical institution, a medical data cloud, and a healthcare company on the left are medical groups used by the user (where the user performs activity). Usually, the medical groups respectively have different medical data. The medical data are acquired in a secret distribution storage of the user. The data are merged to generate a new master data (MA) according to necessity.

As medical data concerning the body and the mind of an individual, data of a plurality of various types are present. There are, for example, medical data accumulated as an intra-hospital database of a medical institution such as a hospital, stored medical data of a medical data cloud accessed and used by the medical institution, and data accumulated by a company that performs healthcare for individuals (for example, a company that performs a service for supporting measures for mental health and measures against life style related diseases).

First, to enable an individual to aggregate and manage medical data of the individual himself or herself distributed to places and services, prior consensus building for exchange of electronic data with a cloud system and a database system functioning as information resources of these medical data is performed. Note that the medical data may widely include medical data irrespective of types and contents of the medical data as long as the medical data include information concerning health of the individual.

Consensus building for data provision is performed with the medical institution and the healthcare company for the data stored in the secret distribution storage of the user based on the consensus building. It is possible to provide requested data from the secret distribution storage of the user to the medical institution and the health care company.

To appropriately keep the consensus building, a blockchain network is used in order to secure reliability of authentication of a genuine individual and legitimate data not falsified. Falsification of data is made practically impossible by chaining to secure reliability of the data. Data sent to a blockchain is not actually medical data. The medical data is indicated by a pointer register-recorded in the blockchain network. Since the end of the pointer is the secret distribution storage, the data is distributed and maintenance of confidentiality and difficulty of falsification are secured. Even if the data is partially damaged or lost, it is possible to cope with the damage or the loss.

Data can be collected in units of data resource provision. Even if new data and update of the data are further added, the data can be configured as one record by the blockchain. It is possible to browse medical related data of the individual from data in the past to the latest data.

For example, periodical medical examination data of Mr. A can be referred to in one record on a BCN. Therefore, it is possible to browse the medical examination data retroactively from the latest medical examination data to medical examination data in the past.

Further, as explained above as the merging, it is possible to combine different data to generate new data. Pointers for referring to the data in the past and the new data can be connected by a chain on the blockchain network (BCN). Since the reference pointers of the data including the new data and the data in the past are not broken, it is also possible to suppress a loss of medical data.

Generation of transaction data (TR) and master data (MA) generated from the transaction data (TR) is explained using medical data as an example with reference to FIG. 10A and FIG. 10B.

FIG. 10A and FIG. 10B show only data body sections of the transaction data (TR) and the master data (MA). One item may be present in the data body sections. However, usually, a plurality of data items are present as in this example.

In an example shown in FIG. 10A, two types of transaction data TR_A and TR_B are present. To facilitate understanding, numbers in parentheses are added to the transaction data TR_A and TR_B in generation time order thereof. Note that the transaction data TR_A is biodata obtained based on "physical examination". The transaction data TR_B is biodata obtained based on measurement of "vital".

Therefore, the respective types of the transaction data TR_A and TR_B include different data items and include individual data (or values) for each of the data items. Note that portions where individual data is not obtained are indicated by "null". That is, the transaction data (TR) is a dataset obtained by combining data of a plurality of items concerning an individual. A plurality of transaction data (TR) indicate a history of the data set.

What are indicated by the items and in which unit they are indicated are managed by an application program installed in an information processing device itself or a memory or a storage device included in the information processing device. Data of the date items are associated with data of which items the data indicates.

Master data (MA) is generated for each transaction data (TR). The master data (MA) and the transaction data (TR) are indicated by the same number to show a correspondence relation between the master data (MA) and the transaction data (TR).

Data nearest to the master data (MA) desirably indicates the latest data of data of the individual. Therefore, concerning the data items, nearest master data (MA) is ruled and programmed to indicate the latest data among transaction data (TR) in the past. However, the portions of "null" are neglected because the data is not obtained. That is, in a plurality of data sets (TR), which are a history concerning the individual, items indicate the latest data among a data set of history data of the items.

For example, in the first transaction data TR(1), master data MA(1) is generated using the data. In the next transaction data TR(2), master data MA(2) generated according to the transaction data TR(2) is generated by combining the transaction data TR(2) and the master data MA(1) preceding the master data MA(2). The latest data is shown concerning the data items while neglecting the portions of "null".

When receiving an instruction for generating the master data (MA), the program generates the master data (MA) according to such a rule. FIG. 10A shows data contents of the transaction data (TR) and the master data (MA).

Besides the update to the master data (MA), the program has a function of merging, that is, a combination processing function of the master data (MA). An example of the function is shown in FIG. 10B.

In "generated master data (MA)" in FIG. 10B, master data (MA_A and MA_B) generated according to two types of transaction data TR_A and TR_B in FIG. 10A are arranged in generation order of the transaction data (TR).

In "master data (MA) to be generated anew", master data MA_C generated anew in the arrangement order is shown. A rule for generating the master data MA_C is the same as the rule shown in FIG. 10A.

Note that a plurality of types of master data (MA) are sometimes obtained from different data resource identifiers. However, if user identifiers (UID) present in the master data (MA) are referred to, it is possible to combine only the master data (MA) of the same user to generate new master data (MA).

The combination and generation by the master data (MA) may be programmed to be higher-degree processing rather than simply reading content (data) of a data item corresponding to the master data (MA). Weight of body fat (kg) and body weight (kg) may be set as data items of the transaction data (TR). As a combination and generation program for the weight of body fat and the body weight, a calculation program of weight of body fat (kg)÷body weight (kg)×100 may be provided. A body fat ratio (%), which is a calculation result, may be set as data of a data item generated anew. In this way, the combination and generation program may be provided as appropriate according to a purpose of the program. It is also possible to perform higher-degree data utilization by performing data combination and generation from different user identifiers (UID).

As it is understood from the above explanation, if the user describes, in content of the access ticket (ACT), an identifier of a storage device used by the user or the processing device 20 of the user that manages the storage device and register-records the identifier with respect to a BCN address of the user, the user can also refer to the latest data and data in the past of the user from the storage device. The user can also provide data of the user to the third party. Buttons such as an "examination result" button, a "pass to a doctor" button, and a "result in the past" button may be prepared on an operation screen as user interfaces to enable the user to easily operate these kinds of processing.

In order to safely perform mutual data exchange with the provider and the third party via the blockchain network (BCN), the blockchain address (BCN Add) may be converted into a QR code (registered trademark). The application program may read the QR code (registered trademark) with a camera provided in the information processing device and transmit the QR code (registered trademark) to a partner destination as a BCN address.

As explained above, it is understood that a plurality of data at different times can be stored in the storage device 30 for the user of the information processing device 20 to enable the user to use the data. That is, an environment in which the user can electronically unitarily manage and store individual data such as a health state by himself or herself is arranged. The user can acquire data corresponding to elapse of time.

The data that can be managed in time series is not limited to medical data indicating a health state such as a periodical health examination result that changes as years and months pass and may be general individual data that changes according to elapse of time.

By having such data in time series also for symptoms of a patient, determination of which is difficult only with a simple present health examination result, it is possible to provide appropriate medical treatment according to health states in the past and a medical care history.

Note that the aggregated data from the past to the present is register-managed by the linked access ticket (ACT) and can be referred to. Therefore, the data from the past to the present may be distributedly stored in a plurality of storage devices 30.

The features of the present invention are obvious from the above description of this specification. It is understood that a more appropriate advice can be provided by a doctor and the like engaged in medical treatment and health promotion by referring to data as a whole.

When there are an extremely large number of data, it is understood that an advice of the data is hindered to the contrary. This occurs not only in medical treatment. What kind of various data are selected as materials of determination is extremely important when seeking, in many fields, more appropriate prescription and various advices to an individual.

As explained with reference to FIG. 1, the data of the legitimate user personally authenticated by the information processing device 20 is stored in the storage device 30 and can be referred to by the register of the linked access ticket (ACT) on the blockchain network (BCN). Further, as shown in FIG. 1 and FIG. 6, it is explained that the individual data is created in the storage device 40 for the user and the individual data can be accessed by the information processing device 60 for the third party as well with reference to the access ticket (ACT) on the blockchain network (BCN).

Data of the storage device 40 for the user accessible by the information processing device 60 for the third party can be used for new activity of the user of the information processing device 20. The user is also capable of receiving more useful information and service from the third party of the information processing device 60 by providing data to the information processing device 60 for the third party.

The information could be information effective for use of other users if consent of the user is obtained. Therefore, the width of effective use of the data of the user himself or herself expands and a value of the data itself is improved.

The information processing device 60 for the third party is an information processing system such as an AI (artificial intelligence) system by machine learning developing in these days or a program or a system executed on a blockchain based on a contract of both parties. The information processing device 60 for the third party could include a smart contract or the like automated to a high degree for answering to an inquiry.

The information processing device 60 may be automated to a high degree or may be operated to reply to the received data according to operation by an expert.

If the information processing device 60 is an AI (artificial intelligence) system, the user is also capable of receiving, with an inquiry to the AI (artificial intelligence) system, an answer by the AI based on data provided by the user.

On the other hand, requests of the user of the information processing device 20 for the user are various. Further, for example, when the medical data is collected from the plurality of institutions and stored in the storage device 30 as shown in FIG. 9, it is not easy for an individual to determine how to use those data.

Therefore, it is necessary to provide new means for delivering data stored in the storage device 30 to the information processing device 60 to allow the user to easily use the data.

FIG. 11 shows the configuration of a basic system of the individual asset data utilization system.

FIG. 11 and FIGS. 1 and 6 are basically different in that, in FIG. 11, an auxiliary system 100 is provided to be interposed between the storage device 30 and the storage device 40 for the user and a storage device 120 that stores answer data from the information processing device 60 is further provided.

The auxiliary system 100 is mutually communicable with the information processing device 20 for the user and accessible from the user. The auxiliary system 100 extracts stored data from the storage device 30 according to inquiry content from the information processing device 20 for the user and converts the data into processed data for processing in the information processing device 60. The processed data can be generated according to a purpose of the user of the information processing device 20. The auxiliary system 100 includes a memory for storing an application program for executing a function explained below. Of a function of the application program stored in the auxiliary system 100 to be performed in cooperation with the information processing device 20 for the user and a function of the application program stored in the memory of the information processing device 20, conceding a function that can be shared by the auxiliary system 100 and the information processing device 20 for the user, to which of the auxiliary system 100 and the information processing device 20 for the user the function is imparted may be selected as appropriate.

The generated processed data is stored in the storage device 40 for the user and can be provided to the information processing device 60 by, for example, the same method as the method explained with reference to FIG. 6. At this time, the information processing device 60 also receives data concerning an inquiry of the user from the information processing device 20. The information processing device 60 may directly receive the inquiry of the user from the information processing device 20 or may receive the inquiry of the user from the auxiliary system 100. The information processing device 60 may directly receive the processed data from the auxiliary system 100 or may receive the processed data from the information processing device 20.

The information processing device 60 generates answer data from the received processed data according to the inquiry content of the user. The answer data is stored in the storage device 120. In this case, the storage device 120 may be the storage device 40 for the user or may be a separate storage device. History data of the storage device 120 may be added to the register for the user of the information processing device 20 as a new access ticket (ACT) in the blockchain 50. As explained above, the storage device 120 may be a distributed storage.

By being added to a distributed register of the blockchain, the information processing device 20 for the user may be able to refer to, as one of transactions, the answer data obtained from the information processing device 60 or may be able to acquire the data.

The data stored in the storage device 120 may be able to be transferred to the auxiliary system 100 or referred to by the auxiliary system 100 or may be able to be acquired. The auxiliary system 100 may be set to be accessible to the data stored in the storage device 120 with reference to a blockchain for the user of the information processing device 20.

By forming this feedback, the auxiliary system 100 can verify the data delivered from the storage device 40 for the user to the information processing device 60. For example, new data created after the data used for creating the processed data by the auxiliary system 100 can be stored in the storage device 30. Therefore, the auxiliary system 100 can acquire data following the data and verify appropriateness of an answer received from the information processing device 60. For example, when a disease name of the user of the information processing device 20 answered by the information processing device 60 is a disease name A and an actual disease name of the user stored in the storage device 30 later is a disease name B, the answer of a wrong disease name is obtained. The auxiliary system 100 side may verify this mistake and change, such that a more appropriate answer can be obtained later, selection of data that should be extracted. In some case, the auxiliary system 100 side may request the information processing device 20 to deliver lacking data.

That is, the auxiliary system 100 can be configured to analyze inquiry content from the information processing device 20, determine which data is extracted from the storage device 30, determine into what kinds of data the data is processed, and compare the data with answer data acquired from the information processing device 60 and verify whether the reply data is appropriate. Naturally, the auxiliary system 100 may be an information processing device or system configured to automatically perform those functions, may be configured to be operable to perform necessary data processing according to operation of an expert related to content of data to be inquired, may be configured to be remotely operable from the user via the information processing device 20, or may be configured by combining those configurations. If the auxiliary system 100 and the information processing device 60 are implemented with the AI technology, an AI-to-AI dialog is performed between the auxiliary system 100 and the information processing device 60. Provision and an answer of more appropriate data can be obtained by mutual deep learning.

Data of user individuals from one or a plurality of institutions can be stored in one or a plurality of storage devices 30. This data is individual data. The access ticket (ACT) configuring the register on the blockchain 50 also has information for specifying an individual.

Further, not only in medical treatment, since individual data has confidentiality, data from which an individual can be specified has to be prevented from attracting wide public attention.

FIG. 12 discloses an example of a configuration for, before providing individual information that should be concealed to the information processing device 60, performing anonymization of the individual information based on the basic configuration shown in FIG. 11.

A part above a broken line indicates a non-anonymized region and a part below the broken line indicates an anonymized region.

Individual data for the user of the information processing device 20 in the storage device 30 can be referred to by the access ticket (ACT) on the blockchain 50 shown in FIG. 7. An application of the information processing device 20 for the user can access the individual data in the storage device 30 referring a blockchain (BC) formed by the access ticket (ACT). Note that, in this example, an example is explained in which transaction data (TR) and master data (MA) generated according to elapse of time are formed in distributed storage devices 30(1) to 30(m) (hereinafter simply referred to as "storage devices 30").

FIG. 12 is different from FIG. 11 in that the individual data of the user of the information processing device 20 is stored in the storage device 40 as anonymized data (hereinafter, anonymous data) and the answer data in the information processing device 60 is also stored in the storage device 120 as anonymous data. Therefore, a blockchain by an access ticket (ACT) for referring to the anonymous data of the user stored in the storage device 40 is separately provided on the BCN. This anonymous data is unique data, although an individual cannot be specified from information of the anonymous data itself. An individual can be identified from the anonymous data on the application of the information processing device 20 for the user that authenticates the user individual.

The auxiliary system 100 generates anonymous data from the individual data stored in the storage device 30 as processed data provided to the information processing device 60. In order to refer to the anonymous data, instead of the blockchain (BC) described above, a blockchain (ABC (anonymous BC)) configured from an anonymous access ticket (AACT (anonymous ACT)) is formed in an address on a BCN registered by the user of the information processing device 20.

This anonymous access ticket (AACT) can also be generated by the application of the information processing device 20 for the user instead of the auxiliary system 100. The application can access the anonymized data in the storage device 40 referring to the access ticket (AACT) of the blockchain ABC (anonymous BC) on the anonymized region side. Note that the anonymized region and the non-anonymized region do not need to be physically present and are conceptually explained to facilitate understanding of the present invention.

The application manages individual authentication information and enables, on condition that a user is personally authenticated, the user to refer to the access ticket (AACT) in the anonymized region of the user in addition to the access ticket (ACT) in the non-anonymized region of the user explained above. Note that, in preparation for an un-authenticatable state, an authentication number or the like for activate may be presented on a display of the information processing device 20 for the user in advance such that a legitimate individual can access data of the individual using the application. Consequently, even if the individual has to use another information processing device, the individual is enabled to use the application on the new information processing device by using the prepared authentication number for activate.

Explaining more in detail with reference to FIG. 12, individual data of the user of the information processing device 20 stored in storage devices 90(i) to 90(n) managed in a plurality of institutions are generated in the storage device 30 as a series of transaction data (TR) usable by the information processing device 20 for the user and master data (MA) generated from the transaction data (TR) through consensus building between the user and the plurality of institutions. The information processing device 20 for the user generates a blockchain register of an access ticket (ACT) in an address on a blockchain network usable by the user. A plurality of access tickets (ACTs) linked like a chain have pointer information such as addresses indicating locations of the transaction data (TR) and the master data (MA) in the storage device 30 such that the user can refer to the respective access tickets (ACTs). The pointer information may be any information indicating where the data is present and having content from which the data can be referred to.

The timestamps are provided in the transaction data (TR) and the master data (MA) as explained above. Therefore, data content of the transaction data (TR) and the master data (MA) can be grasped and managed in time series.

The information processing device 20 for the user and the auxiliary system 100 are configured to be mutually communicable. The auxiliary system 100 receives content of an inquiry desired by the user from the information processing device 20. The auxiliary system 100 is capable of referring to the access ticket (ACT) configuring the blockchain from the information processing device 20 for the user and is capable of accessing the data in the storage device 30 referring to the access ticket (ACT).

The auxiliary system 100 extracts necessary one or a plurality of data out of the data according to inquiry content of the user received from the information processing device 20. In this case, the data may be a combination of one or a plurality of transaction data (TR) and master data (MA). Alternatively, the auxiliary system 100 may generate new master data (MA) from a plurality of transaction data (TR) and store the master data (MA) in the storage device 40. It is possible to determine as appropriate, according to the inquiry content and content of the data, which data is used. However, what is important is that, since the data has time information and a plurality of data at different times can be stored together with the time information, the data can be grasped as an individual time history. Therefore, individual data that changes as time elapses can be provided to the information processing device 60 not as present transitory data. This is effective to determine a symptom and a medical symptom of an individual who needs observation in time course.

When information that can specify an individual is included in data stored in the storage device 40 for the user, the information is removed or information concerning an anonymous person is added and stored instead of the individual specifying information. Further, in the information processing device 20 for the user, a blockchain of an access ticket (ACT) having a pointer for specifying a position of the data stored in the storage device 40 is formed to enable the user to refer to the data. In order to clarify a difference between the access ticket (ACT) configuring this anonymous new blockchain and the blockchain of the access ticket (ACT) shown in FIG. 7, in FIG. 12, reference signs of signs AACT(1) to AACT(1) (anonymous ACTs) are used. Note that, as shown in FIG. 12, the auxiliary system 100 may refer to the non-anonymous access ticket (ACT) and the anonymous access ticket (AACT) via the application of the information processing device 20 for the user instead of more autonomously directly referring to the on-anonymous access ticket (ACT) and the anonymous access ticket (AACT). Data processing and storage of data in the storage device 40 for the user may be performed in cooperation of the application and the auxiliary system 100 by sharing functions each other.

The application of the information processing device 20 delivers the processed data in the storage device 40 and an inquiry and a question of information requested as an answer (collectively referred to as "inquiry") to the information processing device 60 via a network. This inquiry may be performed from the auxiliary system 100 in place of the application of the information processing device 20.

As explained above, the auxiliary system 100 may be an information processing device or system operated by an expert corresponding to content of treated data such as medical treatment or an information processing device incorporating an expert system or may be an information processing device or system implemented with artificial intelligence. Further, the auxiliary system 100 may be an information processing device or system obtained by combining the information processing devices or systems.

As explained above, the information processing device 60 could include an AI (artificial intelligence) system configured to perform data automatic processing to return, as an answer, data matching data and inquiry content from the user, a program or a system executed on a blockchain automated to a high degree for returning an answer matching an inquiry based on a contract of both parties, or a system specialized to a high degree. The information processing device 60 and the auxiliary system 100 may be configured to mutually organically function as one body or the information processing device 60 and the auxiliary system 100 as a whole may be configured to function as an auxiliary system of the blockchain technology.

The information processing device 60 returns, according to a received inquiry, question content, and data, as a consideration, answer data provided from the storage device 40. The consideration is returned because the data provided from the storage device 40 is individual precious data and utilization of the data is a source of deriving useful information as an answer. Therefore, the source sometimes could have a precious value. The system desirably includes means for acquiring reply data such as a virtual currency having a monetary value from the information processing device 60 that has obtained the value. In FIG. 12, the storage device 120, which is data storing means of a conventional type, is shown as an example. However, the information processing device 60 may be able to return the consideration to the user of the information processing device 20 as a virtual currency on a BCN. In particular, acquisition of the consideration as the virtual currency is more smoothly performed by using a smart contract.

The answer data stored in the storage device 120 is made accessible by the auxiliary system 100 to be comparable with the data delivered from the storage device 40. Therefore, since a feedback that can compare given information and obtained information is formed, it is possible to improve accuracy of the data processing of the auxiliary system 100.

An anonymous access ticket (AACT) indicating the data stored in the storage device 120 may be further added to the anonymous blockchain (ABC) such that the data can be referred to. Consequently, the information processing device 20 and the auxiliary system 100 are capable of accessing from the anonymous blockchain (ABC) to the answer data acquired from the information processing device 60 for the third party.

Note that, as explained above, the auxiliary system 100 may be an information processing device or system operated by an expert corresponding to content of treated data such as a medical examination and medical treatment or an information processing device incorporating an expert system, may be an information processing device or system implemented with artificial intelligence. Alternatively, the auxiliary system 100 may be an information processing device or system configured to operate according to an application programmed such that an implemented artificial intelligence or expert system can exert the functions explained above.

The present invention is further disclosed below.

(Item 1)

A data utilization method for acquiring, with an information processing device used by an individual, data related to information concerning the individual and making it possible to utilize the data, the method comprising:

a step of transmitting data concerning an address on a blockchain network used by the individual to a provision source of the data related to the information concerning the individual via a network;

a step of issuing data for access (ACT) including the data concerning the address and the data for identifying the provision source of the data to the address of the blockchain network and registering the data for access (ACT); and a step of specifying the provision source of the data by referring to the data for access (ACT) from the address of the blockchain network and acquiring the data related to the information concerning the individual from the specified provision source.

(Item 2)

The data utilization method described in item 1, wherein the data provided from the provision source includes identification information of an individual permitted to use the data by the information processing device.

(Item 3)

The data utilization method described in item 1 or 2, wherein the data provided from the provision source includes identification information of the information processing device used by the individual.

(Item 4)

The data utilization method described in any one of items 1 to 3, wherein the data provided from the provision source includes identification information of the provision source.

(Item 5)

The data utilization method described in any one of items 1 to 4, wherein the data provided from the provision source includes information indicating generation time of the data.

(Item 6)

The data utilization method described in any one of items 1 to 5, wherein the data (MA) provided from the provision source is a data set including data concerning a plurality of respective data items generated based on a plurality of data (TR), which are history data concerning the individual.

(Item 7)

The data utilization method described in item 6, wherein each of the plurality of data items indicates latest data in the data set of the history data.

(Item 8)

The data utilization method described in any one of items 1 to 7, wherein at least the data related to the information concerning the individual is hashed by a hash function.

(Item 9)

A system for acquiring, with an information processing device used by an individual, data related to information concerning the individual and making it possible to utilize the data, the system comprising the information processing device, wherein the information processing device includes at least a memory or a storage device connected to the information processing device, and the information processing device has:

a function of transmitting data concerning an address on a blockchain network used by the individual to a provider-side information processing device including a storage device serving as a provision source of the data related to the information concerning the individual;

a function of referring to, from the provider-side information processing device, data for access (ACT) including the data concerning the address issued to the address of the blockchain network and data for identifying the provision source of the data; and a function of acquiring, based on the data for access (ACT), the data related to the information concerning the individual and storing the data in at least a memory or a storage device of the individual.

(Item 10)

The data utilization system described in item 9, wherein the data provided from the provision source includes identification information of an individual permitted to use the data by the information processing device.

(Item 11)

The data utilization system described in item 9 or 10, wherein the data provided from the provision source includes at least identification information of the information processing device used by the individual, identification information of the provision source, and information indicating generation time of the data.

(Item 12)

The data utilization system described in any one of items 9 to 11, wherein the data (MA) provided from the provision source is a data set including data concerning a plurality of respective data items generated based on a plurality of data (TR), which are history data concerning the individual.

(Item 13)

The data utilization system described in item 12, wherein each of the plurality of data items indicates latest data in the data set of the history data.

(Item 14)

The data utilization system described in any one of items 9 to 13, wherein at least the data related to the information concerning the individual is hashed by a hash function.

(Item 15)

A program for acquiring data related to information concerning an individual, the program being stored in an information processing device used by the individual and executed by a first information processing device, the program comprising:

a step of providing a blockchain address to another information processing device; and a step of acquiring, based on data for access (ACT) including information concerning the blockchain address transmitted from the other information processing device based on the blockchain address, the data related to the information concerning the individual generated by the other information processing device or a storage device used by the information processing device.

(Item 16)

The program described in item 15, wherein the data related to the information concerning the individual includes identification information of an individual permitted to use the data by the information processing device.

(Item 17)

The program described in item 15 or 16, wherein the data related to the information concerning the individual includes at least identification information of the information processing device used by the individual, identification information of the provision source, and information indicating generation time of the data.

The invention claimed is:

1. A method for enabling a user of a first information processing device to provide access to medical records of the user to a third-party information processing device associated with a third party, the medical records being stored in a storage device used by a second information processing device associated with a provider of medical services, the method comprising:

providing, with the first information processing device of the user, a blockchain address associated with the user to the second information processing device associated with the provider of medical services, the blockchain address indicating a storage area on a blockchain network used by the first information processing device and the storage area being configured to facilitate a recording data using a distributed ledger;

registering, with the second information processing device, access ticket data (ACT) for recordation in the distributed ledger in the storage area of the blockchain network at the blockchain address provided by the first information processing device, the access ticket data (ACT) including (i) a hash of the blockchain address associated with the user and (ii) a data resource identifier that is a pointer to a master record of the medical records of the user stored in the storage device, the master record being associated with a plurality of transaction records of the medical records of the user, each transaction record of the plurality of transaction records including medical data associated with the user and generated by the provider of medical services;

receiving, with the first information processing device, a request for access to the medical records from the third party;

retrieving, with the first information processing device, the access ticket data (ACT) from the storage area on the blockchain network used by the first information processing device and providing the access ticket data to the third-party information processing device associated with the third party; and accessing, with the third-party information processing device, the medical records of the user stored in the storage device used by the second information processing device by using the data resource identifier as the pointer to the master record of the medical records of the user stored in the storage device and then retrieving each transaction record of the plurality of transaction records associated with the master record, each transaction record including medical data associated with the user and generated by the provider of medical services.

2. The method according to claim 1, wherein the medical records further include at least one of: identification information identifying the second information processing device; and information indicating generation time of the medical records.

3. The method according to claim 1, wherein each transaction record of the plurality of transaction records includes history data concerning the user.

4. The method according to claim 3, wherein each transaction record of the plurality of transaction records indicates latest data in the data set of the history data.

5. The method according to claim 1, further comprising:
generating, based on the medical records, processed data with an auxiliary system in communication with the first information processing device;
transmitting, with at least one of the auxiliary system or the first information processing device, the processed data and inquiry data to the third-party information processing device of the third party; and acquiring or referring to, with the first information processing device or the auxiliary system, answer data from the third-party information processing device.

6. The method according to claim 5, wherein the auxiliary system acquires data related to information concerning the user by referring to the access ticket data (ACT) stored in the storage area on the blockchain network.

7. The method according to claim 5, wherein the auxiliary system is operated by an expert related to the medical records or operated via the first information processing device, and the processed data is generated from the data concerning the user according to inquiry content.

8. The method according to claim 5, wherein the auxiliary system is implemented with an expert system or an artificial intelligence system, and the processed data is generated by the expert system or the artificial intelligence system.

9. A system for enabling a user to provide access to medical records of the user to a third-party information processing device associated with a third party, the medical records being stored in a storage device of a second information processing device associated with a provider of medical services, the system comprising:
a first information processing device used by and associated with the user and configured to provide a blockchain address associated with the user to the second information processing device that uses the storage device and is associated with the provider of medical services, the blockchain address indicating a storage area on a blockchain network used by the first information processing device and the storage area being configured to facilitate recording data using a distributed ledger;
the second information processing device is configured to register access ticket data (ACT) for recordation in the distributed ledger in the storage area of the blockchain network at the blockchain address provided by the first information processing device,
the access ticket data (ACT) including (i) a hash of the blockchain address associated with the user and (ii) a data resource identifier that is a pointer to a master record of the medical records of the user stored in the storage device, the master record being associated with a plurality of transaction records of the medical records of the user, each transaction record of the plurality of transaction records including medical data associated with the user and generated by the provider of medical services;
the first information processing device is further configured to receive a request for access to the medical records from the third party, retrieve the access ticket data (ACT) from the storage area on the blockchain network used by the first information processing device and provide the access ticket data to the third-party information processing device associated with the third party; and
the third-party information processing device is configured to access the medical records of the user stored in the storage device used by the second information processing device by using the data resource identifier as the pointer to the master record of the medical records of the user stored in the storage device and then retrieving each transaction record of the plurality of transaction records associated with the master record, each transaction record including medical data associated with the user and generated by the provider of medical services.

10. The system according to claim 9, wherein the medical records further include at least one of: identification information identifying the second information processing device; and information indicating a generation time of the medical records.

11. The system according to claim 9, wherein each transaction record of the plurality of transaction records includes history data concerning the user.

12. The system according to claim 11, wherein each transaction records of the plurality of transaction records indicates latest data in the data set of the history data.

13. The system according to claim 9, further comprising an auxiliary system communicable by the first information processing device, wherein the auxiliary system is configured to be capable of generating processed data based on data related to information concerning the user referred to by the access ticket data (ACT), and the processed data and inquiry data of the user are transmitted to the third-party information processing device of the third party by at least one of the auxiliary system and the first information processing device and answer data from the third-party information processing device of the third party is acquired or referred to by the first information processing device or the auxiliary system according to the inquiry data.

14. The system according to claim 13, wherein the auxiliary system is configured to acquire data related to the information concerning the user by referring to the access ticket data (ACT) on the blockchain network.

15. The system according to claim 13, wherein the auxiliary system is operated by an expert related to the medical records or operated via the first information processing device, and the processed data is generated from the data concerning the user according to inquiry content.

16. The system according to claim 13, wherein the auxiliary system is implemented with an expert system or an artificial intelligence system, and the processed data is generated by the expert system or the artificial intelligence system.

* * * * *